United States Patent
Dailey, Jr.

(10) Patent No.: US 8,601,942 B2
(45) Date of Patent: Dec. 10, 2013

(54) PECAN NUT MEAT EXTRACTOR

(76) Inventor: Carleton A. Dailey, Jr., Oakland Park, FL (US)

( * ) Notice: Subject to any disclaimer, the term of this patent is extended or adjusted under 35 U.S.C. 154(b) by 129 days.

(21) Appl. No.: 13/199,122

(22) Filed: Aug. 19, 2011

(65) Prior Publication Data

US 2013/0042766 A1   Feb. 21, 2013

(51) Int. Cl.
*A23N 5/00* (2006.01)
*A47J 43/00* (2006.01)

(52) U.S. Cl.
USPC ............................ 99/575; 99/574; 99/581

(58) Field of Classification Search
USPC .................... 99/575, 574, 580, 581
See application file for complete search history.

(56) References Cited

U.S. PATENT DOCUMENTS

| | | | | |
|---|---|---|---|---|
| 260,750 | A * | 7/1882 | Gratiot | 426/518 |
| 807,551 | A * | 12/1905 | Gordon | 99/575 |
| 1,194,318 | A * | 8/1916 | Power | 99/575 |
| 1,264,329 | A * | 4/1918 | Pike | 99/574 |
| 2,138,302 | A * | 11/1938 | Kilner | 99/641 |
| 3,626,478 | A * | 12/1971 | Lawton | 99/576 |
| 4,448,115 | A | 5/1984 | Volk, Sr. | |
| 4,819,331 | A * | 4/1989 | Joyama | 30/120.2 |
| 4,993,155 | A | 2/1991 | Andrews | |
| 4,996,917 | A * | 3/1991 | Burlock et al. | 99/575 |
| 5,415,085 | A * | 5/1995 | Thomson | 99/574 |
| 6,516,714 | B2 | 2/2003 | Warmack et al. | |
| 6,588,328 | B1 | 7/2003 | Quantz et al. | |
| 8,267,009 | B2 * | 9/2012 | Andreasen | 99/575 |

FOREIGN PATENT DOCUMENTS

WO   WO2008/024036   2/2008

* cited by examiner

*Primary Examiner* — Reginald L Alexander
(74) *Attorney, Agent, or Firm* — Melvin K. Silverman

(57) ABSTRACT

A pecan nut meat preferably for use with pecans, extractor includes a hollow frusto-conical segment journalled about an axial drive shaft, the segment having a minor upper base and a major lower base, the upper and lower bases each defining unitary surfaces for precluding access to a hollow interior of the segment, the segment including a frusto-conical lateral surface between its upper and lower bases, the lateral surface including a multiplicity of splines having interdigitating spaces similar in polar separation to that of the splines. The extractor also includes a hollow cylinder proportioned for symmetrical containment of the frusto-conical segment below and about it, including elements for securing the cylinder during rotation of the frusto-conical segment, an Interior surface of the cylinder opposing the lateral surface of the conical segment and defining a pattern of protrusions for interaction with shells of nuts provided to the extractor between the surface of the conical segment and the interior surface of the cylinder. The interaction and associated pressure on shells of the nuts increases as a function of axial downward advance of nuts fed into an upper interstitial annular region between the upper base and an upper area of the interior of the hollow cylinder. Pressure upon shells of the nuts increases as a function of advance thereof the lower base until the nuts are cracked, the cylinder bottom including an exit chute permitting release of cracked nuts from the cylinder.

15 Claims, 3 Drawing Sheets

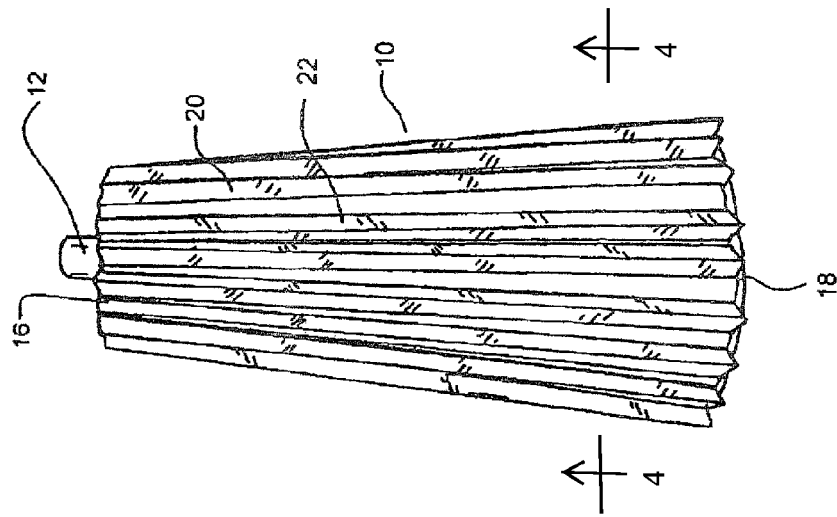
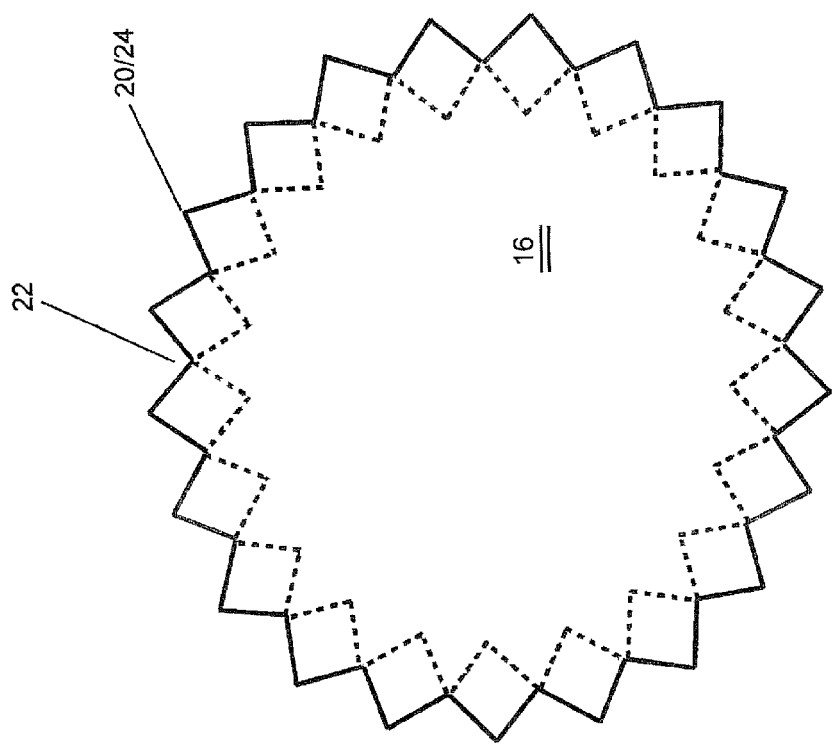

PECAN NUT MEAT EXTRACTOR

FIELD OF THE INVENTION

The invention relates to an apparatus for the extraction of pecan nut meat from the shells thereof.

BACKGROUND OF THE INVENTION

In the business of processing pecan nuts of various types, the de-shelling or cracking of the nut shell has presented a continual problem for many years.

Further, with growth of population, the need for nut meat extraction system capable of high rates of production of nut meat has increased.

Further, not all nuts are cracked or hulled in the same manner and, therefore, apparatus applicable to one type of nut may be inappropriate or inefficient with respect to another type of nut.

Pecan nuts have been particularly challenging for purposes of cracking, hulling and separation of the nut meat from the nut shell. Pecans are grown principally in North Carolina, Georgia, Pennsylvania, Texas and Oklahoma. The principal varieties of pecans are known as the Caddo, Cape Fear, Desirable, Gloria Grande, Kiowa, Pawne, Stuart, and Sumner. Because of this considerable diversity in the variety of pecans, the provision of a cracking de-shelling apparatus equally suitable for processing and yielding a high rate of production of all such varieties of pecans has proven particularly difficult for the pecan industry. The primary participants in the pecan nut cracking business are the Pearce Brothers, Champion, Myers, and Savage Companies. None of these companies, however, are capable of de-shelling pecans, of whatever variety, at a rate which the present invention has proven to be capable of, namely, cracking in the range of 1200 to 1600 nuts per minute.

The prior art, known to the inventor, is represented by U.S. Pat. No. 6,588,328 (2003) to Quantz et al; U.S. Pat. No. 6,516,714 (2003) to Warmack, U.S. Pat. No. 4,993,115 (1991) to Andrews, and U.S. Pat. No. 4,448,115 (1984) to Volk, Sr. which, however, is particular to the hulling of pistachio nuts. Some related mechanisms have been suggested for the peeling of certain varieties of seeds such as sunflower seeds as is reflected in WIPO application WO/2008/024036 to Aboras.

None of the above structures or systems are however practical for the accomplishment of suitably efficient cracking or nut hulling of pecans, particularly without damage to the nut meat or mixing of the nut meat with the nut shells.

All of the above long felt limitations and needs of the prior art in the area of pecan cracking and hulling are addressed by the instant invention.

SUMMARY OF THE INVENTION

A pecan nut meat extractor, preferably for use with pecans, includes a substantially hollow frusto-conical segment journalled about an axial drive shaft, said segment having a minor upper base and a major lower base, said upper and lower bases each defining unitary surfaces for precluding access to a hollow interior of said conical segment, said segment further including a frusto-conical lateral surface between said upper minor and lower major bases, said lateral surface including a multiplicity of splines having interdigitating spaces therebetween substantially similar in polar separation to that of said splines. Further included is a hollow cylinder proportioned for symmetrical containment of said frusto-conical segment below and about said segment, including means for securing said hollow cylinder during rotation of said frusta-conical segment, an interior surface of said cylinder opposing said lateral surface of said conical segment and defining a pattern of protrusions for interaction with shells of nuts provided to the extractor between said lateral surface of said conical segment and said interior surface of said cylinder. The interaction and associated pressure on shells of said nuts increases as a function of axial downward advance of nuts fed Into an upper interstitial annular region between said upper minor base and an upper area of said interior of said hollow cylinder. Pressure upon shells of the nuts increases as a function of advance thereof toward said lower major base until said nuts are cracked, said cylinder bottom including an exit chute permitting release of cracked nuts from said cylinder. Thereafter, the nut shells are separated from the nut meat by a pneumatic gradient.

It is accordingly an object of the present invention to provide a pecan nut cracking system capable of high speed extraction of nut meat from the shells thereof.

It is another object to provide a system of the above type particularly adapted to the nut meat extraction needs of the pecan growing and production industry.

It is a further object of the invention to provide a system of high speed separation of pecan nut meat from nut shells without penetration of the nut shells into the meat which is extracted therefrom.

It is a yet further object to provide an apparatus capable of simple, economical and high speed extraction of nut meat from the shells thereof.

It is a another object to provide an apparatus of the above type in which the parts thereof will function for a considerable period without requirement for service.

It is a further object of the invention to provide a nut cracking apparatus that may be successfully configured to accommodate any size pecan, while providing an apparatus requiring only minimal supervision during its operation.

It is another object to provide a system of the above type which is compact, low in cost, and reliable in operation for repeated long-term high speed use without loss of efficiency in the cracking of pecans.

The above and yet other objects and advantages of the present invention will become apparent from the hereinafter set forth Brief Description of the Drawings, Detailed Description of the Invention and Claims appended herewith.

BRIEF DESCRIPTION OF THE DRAWINGS

FIG. 1 is a vertical elevational view of the conical segment used in the inventive system.

FIG. 4 is a radial cross-sectional view taken along Line 4-4 of FIG. 1.

DETAILED DESCRIPTION OF THE INVENTION

With reference to the views of FIGS. 1-3 and 5, there is shown a substantially hollow frusto-conical segment 10 which is journalled about an axial drive shaft 12, which is powered by a motor 14 having an output in mechanical communication with said axial drive shaft 12 of the conical segment. Such a motor will typically exhibit a horsepower in a range of 0.25 to about 0.5, thus producing a rate of rotation of the conical segment 10 in a range of about 100 to about 140 rpm, with 120 rpm having been found to be optimal.

Figure 2:
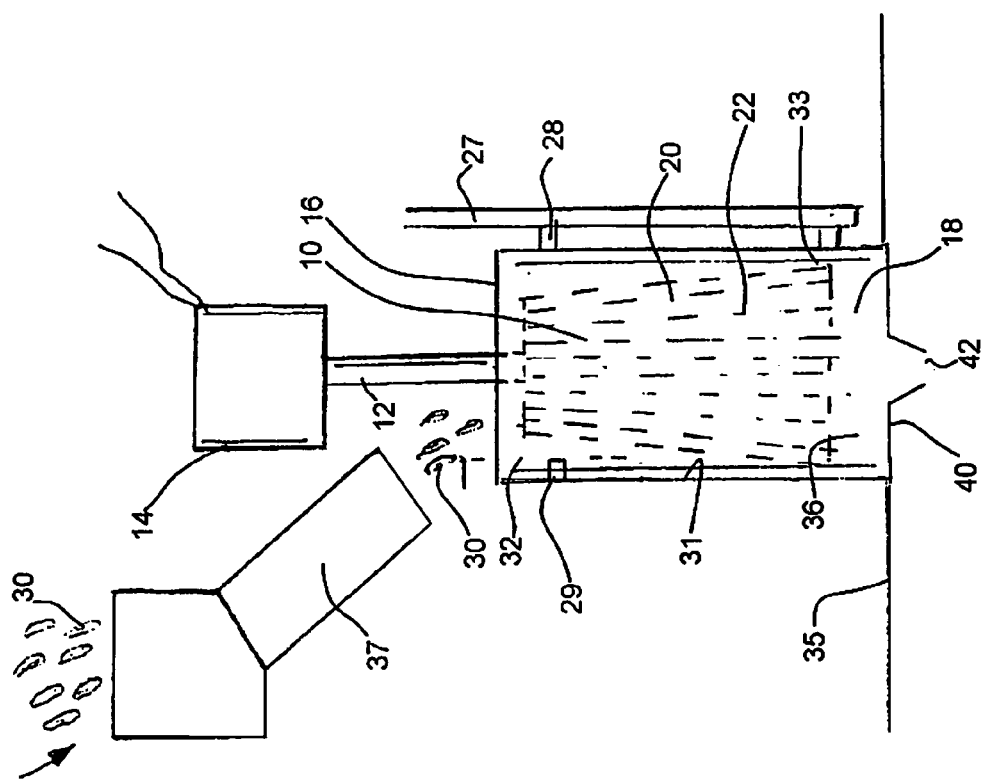
FIG. 2 is a vertical cross-sectional schematic view showing the material elements of the invention inclusive of the cylinder and conical segment shown in FIG. 1.

As may be noted in FIGS. 1 and 2, said conical segment includes a minor upper base 16 and a major lower base 18, said bases each defining unitary surfaces to preclude access to the hollow interior of the conical segment 10. In a preferred embodiment, the ratio of diameters to the upper base to the lower base is that of 7 to 8, such that a preferred range of the ratio of diameters of the minor upper base to the major lower base falls within a range of about 0.7:1 to about 0.9:1.

The hollow frusto-conical segment 10 is also characterized by a multiplicity of splines 20 having interdigitating spaces 22 therebetween of substantially similar polar separation to that of said splines. The splines 20 and the lateral spaces 22 of the conical segment are polarly separated from each other by a range of about 8 to about 10 degrees. This polar separation is accomplished by the provision of a circumferential substantially equilaterally triangular pattern 24 (see FIG. 4) upon the minor upper base 16 of the conical segment as well as the lower base 18. Thereby, after inserting the splines, preferably formed of steel, that are about ⅜ inch square within said triangular pattern 24, said splines are welded in place to the upper and lower bases 16 and 18 of the conical segment. The conical segment 20 is formed of a number of splines, in the manner set forth above, in a number of about 30 to about 50, in which 40 splines are generally optimal, that is, one every 9 degrees although the range thereof may be 8 to 10 degrees.

Figure 5:
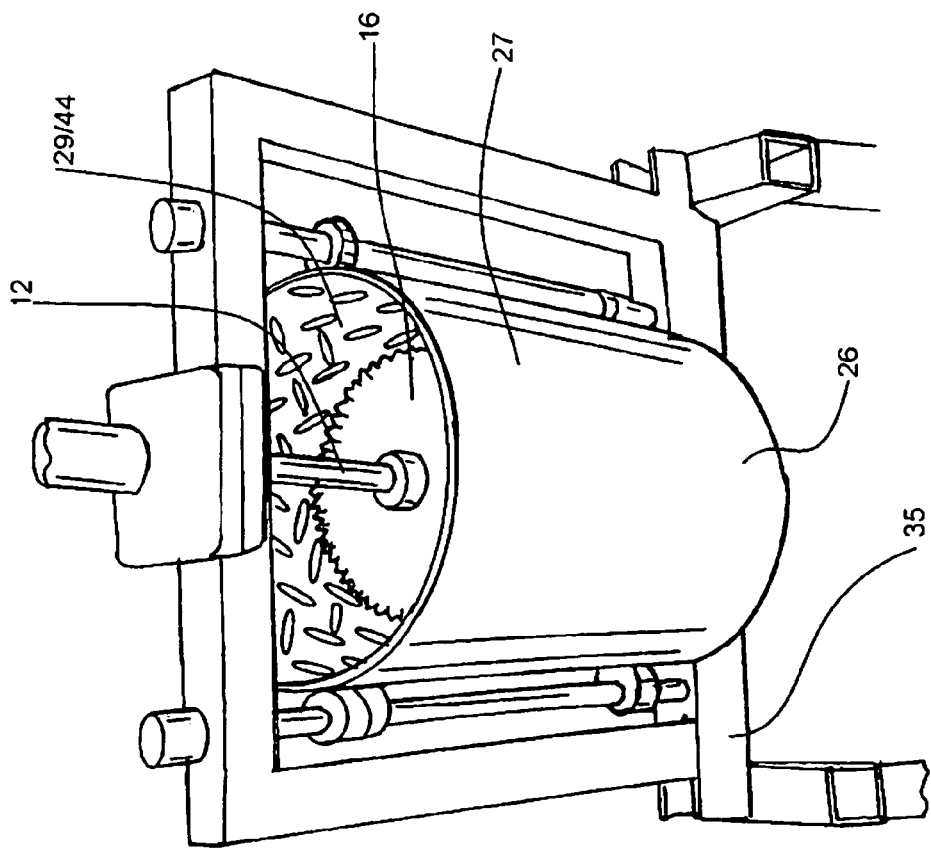
FIG. 5 is a top diagonal perspective view showing the conical segment placed within its circumferential cylinder and the zig-zag linear skid structure exhibited by the interior surface of the system cylinder.

As may be noted in FIGS. 2 and 5, conical segment 10 is proportioned for symmetrical containment within a hollow cylinder 26 which includes means such as handles 28 and rods 27 for securing the cylinder during rotation of the conical segment. The cylinder is supported by a rectilinear structure 35.

Figure 3:
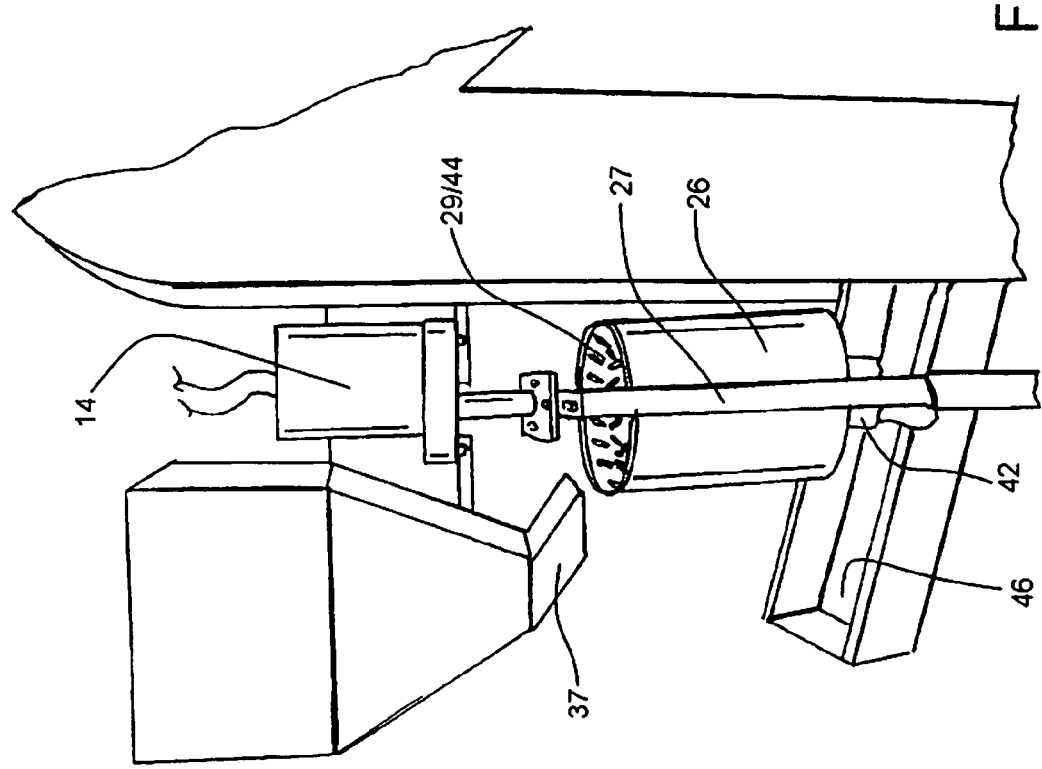
FIG. 3 is a perspective view showing the inventive system in its operating environment inclusive of a chute and trough which receives the nuts after extraction therefrom.

As may be noted in FIGS. 3 and 5, the interior of the conical segment defines a pattern 29 of protrusions for interaction with shells of pecan nuts 30 (see FIG. 2) provided to the inventive nut meat extractor from chute 37 between said lateral surface 20 of the conical segment and interior surface 31 of the cylinder.

After suitable boiling of 3-12 minutes, the nuts are fed through chute 37 into annular separation 32 (see FIG. 2) of the apparatus, as rotation of the conical segment causes interaction between and associated pressure upon, the shells of nuts, such as pecans, which increases as a function of axial downward advance of the nuts into interstitial annular region 32 between upper minor base 16 and inner wall 31 of the cylinder. The nuts tend to rotate on their longitudinal axes as they advance toward lower major base 18 to annular region 33 until the shell of the nuts are cracked. See FIG. 2.

Cylinder 10 is selectably elevated or lowered to a dimension 36 above base 40 of the cylinder, such that the nut may advance at a selectable rate to an exit chute 42, thus permitting release of the cracked nuts and shells from cylinder 26. The nut meat is then separated from the nut shells by a pneumatic gradient provided within trough 46. See FIG. 3.

It is noted that the annular region 33 which exists between lower major base 18 of the splines 20 and inner cylinder wall 31 at the bottom thereof defines in a range of about 0.30 to about 0.40 inches while, at the top of the system, the annular separation 32 between the upper minor base and the opposing interior of said cylinder defines a dimension in a range of about 1.4 to about 1.75 inches. As such, the annular separation $^{32}/_{33}$ narrows considerably from top to bottom. See FIG. 2.

The length of the longitudinal axis of conical segment 10 is typically in a range of about 6 to about 10 inches, with 8 inches considered optimal.

The height of cylinder 26 is typically in a range of about 8 to about 12 inches, with 10 inches considered optimal.

It is noted that the inner surface 29 (see FIGS. 3 and 5) of the cylinder 26 defines many so-called linear skids 44 arranged in a plurality of circumferential rows in which each skid tilts in a first direction and is parallel to every other skid in a given row. Each row however is separated by a different row of skids of a similar linear length and radial protrusion, however tilted in an opposite linear direction, thereby producing an axial zig-zag appearance as between successive rows of the skids 44. It is to be appreciated that the present inventive nut meat extractor, while primarily designed for the extraction of nut meat from pecans, is equally useful in the processing of peanuts and other nuts.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A pecan nut meat extractor, comprising:
   (a) a substantially hollow frusto-conical segment journalled about an axial drive shaft, said segment having a minor upper base and a major lower base, said upper and lower bases each defining unitary surfaces for precluding access to a hollow interior of said conical segment, said segment further including a frusto-conical lateral surface between said upper minor and lower major bases, said lateral surface including a multiplicity of splines having interdigitating spaces therebetween substantially similar in polar separation to that of said splines, said splines defining elongate metallic elements, each having a substantially square cross-section, sides of said splines secured within equipolar complemental substantially equilateral triangular indentations formed circumferentially within said frusto-conical segments; and
   (b) a hollow cylinder proportioned for symmetrical containment of said frusto-conical segment below and about said segment, including means for securing said hollow cylinder during rotation of said frusto-conical segment, an interior surface of said cylinder opposing said lateral surface of said conical segment and defining a pattern of protrusions for interaction with shells of pecan nuts provided to the extractor between said lateral surface of said conical segment and said interior surface of said cylinder, said interaction and associated pressure on shells of said nuts increasing as a function of an axial downward advance of nuts fed into an interstitial annular region between said frusto-conical segment and an upper area of said interior of said hollow cylinder, wherein pressure upon shells of said nuts increases as a function of advance thereof toward said lower major base until said nuts are cracked, said cylinder bottom including an exit chute permitting release of cracked nuts from said cylinder.

2. The nut meat extractor as recited in claim 1, in which a ratio of diameters of said minor to said major base falls within a range of about 0.7:1 to about 0.9:1.

3. The nut meat extractor as recited in claim 2, in which said longitudinal splines on said lateral surface of said conical segment are polarly separated from each other in a range of about 8 to about 10 degrees.

4. The nut meat extractor as recited in claim 2, in which a number of longitudinal splines situated upon the lateral surface of said conical segment defines a range between about 30 and about 50.

5. The nut meat extractor as recited in claim 4, in which an annular separation between said major base of said conical segment and said cylinder proximally to a bottom thereof falls within a range of about 0.30 to about 0.40 inches.

6. The nut meat extractor as recited in claim 5, in which an annular separation between said minor upper base and an opposing interior of said cylinder defines a dimension in a range of about 1.4 to about 1.75 inches.

7. The nut meat extractor as recited in claim 4, further comprising:
a motor having an output in mechanical communication with said axial drive shaft of said conical segment having a horsepower in a range of about 0.25 to about 0.5 horsepower and producing a rate of rotation of said conical segment in a range of about 100 to about 140 rpm.

8. The nut meat extractor as recited in claim 4, including said nuts provided into said interstitial annular region comprise pecan nuts.

9. The nut meat extractor as recited in claim 2, in which the length of a longitudinal axis of said conical segment is in a range of about 6 to about 10 inches.

10. The nut meat extractor as recited in claim 2, in which said cylinder defines a height in a range of about 8 to about 12 inches.

11. The nut meat extractor as recited in claim 2, in which the inner surface of said cylinder is formed of a skid plate material defining a multiplicity of linear raised surfaces having a linear dimension in a range of about 1 to about 3 inches.

12. The nut meat extractor as recited in claim 2, in which a ratio of the dimension of said upper base to said lower base of said conical segment defines a ratio of about 7 to 8.

13. The nut meat extractor as recited in claim 1, said linear skids exhibiting a plurality of circumferential rows, each skid tilting in a first direction and parallel to every other skid in such row, each such skid row separated by a row of similar linear length and diagonal protrusion however tilted in an opposite linear direction, thereby producing an axial zig-zag appearance as between successive rows of said skids.

14. The nut meat extractor as recited in claim 1, in which edges of said splines define a dimension of between about 0.3 inches to about 0.5 inches.

15. The nut meat extractor as recited in claim 1, in which nut provided into said interstitial annular region comprise pecan nuts.

* * * * *